United States Patent

Horrey et al.

[11] 3,901,347
[45] Aug. 26, 1975

[54] VEHICLE CONTROL SYSTEM

[75] Inventors: Edward Lawrence Horrey; Barry Keith Atkins, both of Sheerness, England

[73] Assignee: Waso Limited, Sheerness, England

[22] Filed: July 9, 1973

[21] Appl. No.: 377,624

[30] Foreign Application Priority Data

July 12, 1972 United Kingdom............ 32659/72

[52] U.S. Cl.............................. 180/114; 123/198
[51] Int. Cl.²....................................... B60R 25/04
[58] Field of Search ....... 70/243; 180/114; 123/198; 307/10 AT; 251/133

[56] References Cited
UNITED STATES PATENTS

| | | | |
|---|---|---|---|
| 2,956,188 | 10/1960 | White | 251/133 X |
| 3,354,980 | 11/1967 | Nielsen | 180/114 |
| 3,641,489 | 2/1972 | Shimomura | 180/114 X |
| 3,682,267 | 8/1972 | Kayser | 180/114 |
| 3,687,216 | 8/1972 | Tracy | 180/114 |

*Primary Examiner*—Stanley H. Tollberg
*Assistant Examiner*—Norman L. Stack, Jr.
*Attorney, Agent, or Firm*—Parmelee, Miller, Welsh & Kratz

[57] ABSTRACT

A vehicle control system in which when the ignition of a vehicle is activated an electric motor operates to drive a movable member controlling the fuel supply of the vehicle to enable the engine of the vehicle to start. When the ignition is deactivated the electric motor operates in the reverse sense to drive the movable member to control the fuel supply so that the engine cannot be started. On vehicles with integral steering wheel/ignition locks by-passing of the ignition and starting the engine with the steering still locked is prevented.

10 Claims, 9 Drawing Figures

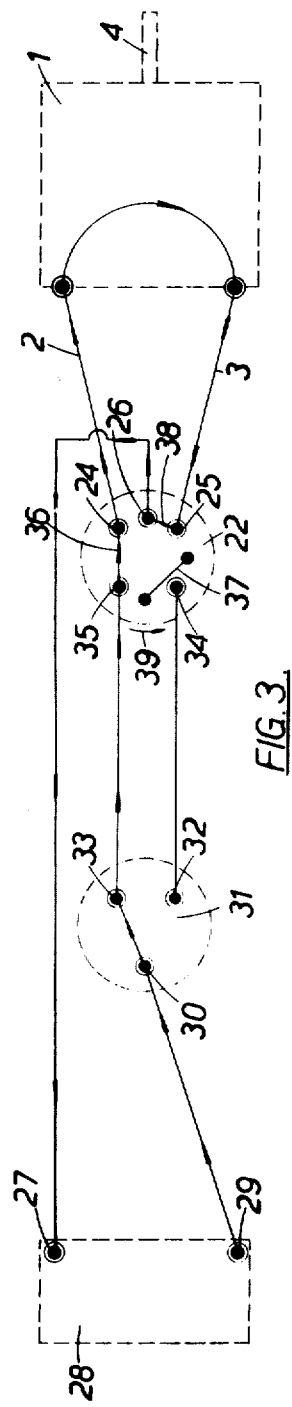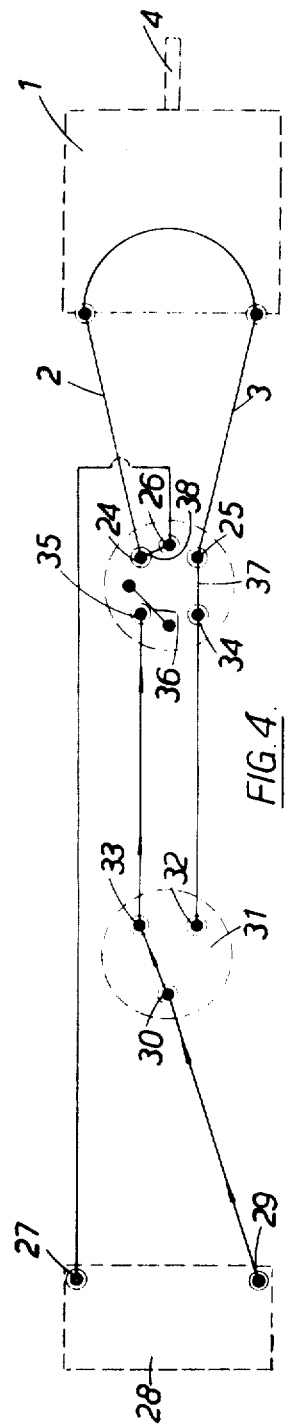

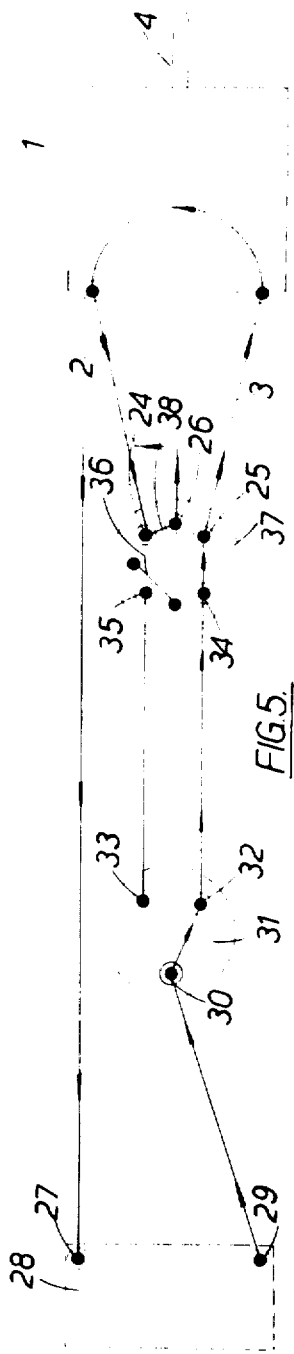
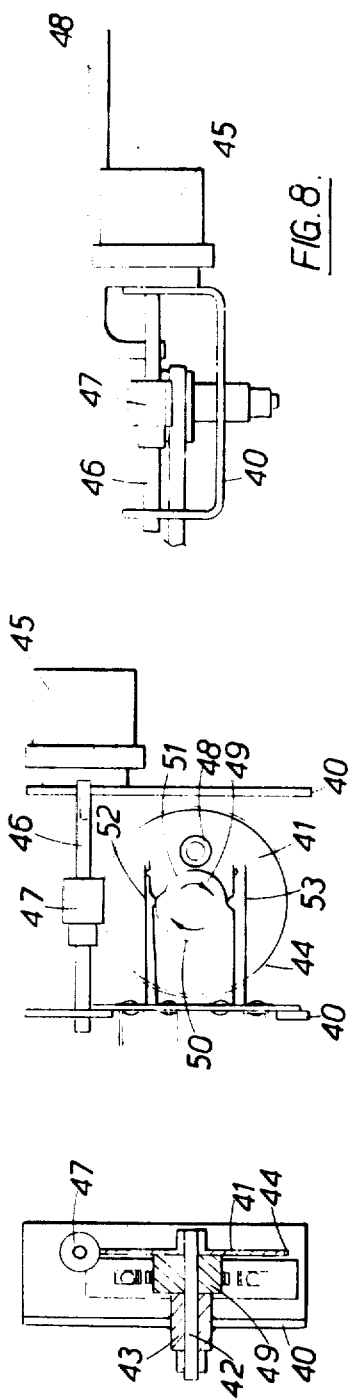

3,901,347

VEHICLE CONTROL SYSTEM

This invention relates to a vehicle control system and more particularly to a vehicle immobilising system suitable for use with a vehicle having an electrical services, or other manually operated electrical control switch, and in which a liquid or gaseous fuel is supplied to the engine.

Many vehicles are presently provided with a key operated control switch such as an ignition or electrical services switch which is adapted to operate to complete electrical circuits in a vehicle. The key operated control switch may also be adapted to operate the starter motor of the vehicle. Many such key operated control switches are incorporated in a key operated device that includes a locking abutment adapted to engage and lock against movement a component of the vehicle, such as the steering shaft, the gear lever, or a gear selector shaft, while the control switch is in the "off" position.

It is an object of this invention to provide a vehicle control system in which the fuel supply to the engine of a vehicle will be controlled in response to actuation of the electrical services or other control switch.

A preferred embodiment of the invention comprises a system in which whenever the lock of a vehicle is operated to lock the steering shaft of the vehicle the fuel supply to the engine of the vehicle will be controlled to prevent the vehicle from being started. Thus it is not possible to start the engine of a vehicle while the steering shaft is locked.

This invention relates to a vehicle control system comprising a manually operated control switch, and an auxiliary device adapted to operate in response to actuation of the control switch, said auxiliary device being adapted to control a fuel supply system of the said vehicle.

The invention is characterised in that said auxiliary device comprises an electric motor, and a member driven by said electric motor, the arrangement being such that the member is driven to one position when said control switch is in one condition, and is driven to another position when said control switch is in another condition.

In this specification the term fuel supply system is intended to denote the system by which fuel is introduced to an engine and prepared for ignition. It is to be understood that any expedient for preventing the introduction or preparation of the fuel may be considered as a control of the fuel supply system. In particular means preventing fuel from being compressed (i.e. means for opening cylinder exhaust valves) are envisaged.

In order that the invention may be more readily understood and so that further features thereof may be appreciated embodiments of vehicle control systems in accordance with the invention will now be described by way of example with reference to the accompanying drawings in which:

FIGS. 3 to 5 are schematic circuit diagrams of a circuit forming a part of the embodiment illustrated in FIGS. 1 and 2 in various positions;

FIG. 6 is a side view of a further embodiment of a vehicle control system in accordance with the invention;

FIG. 7 is an elevational view of the embodiment in accordance with the invention illustrated in FIG. 6;

FIG. 8 is a plan view of the embodiment of the invention illustrated in FIGS. 6 and 7.

Figure 1:
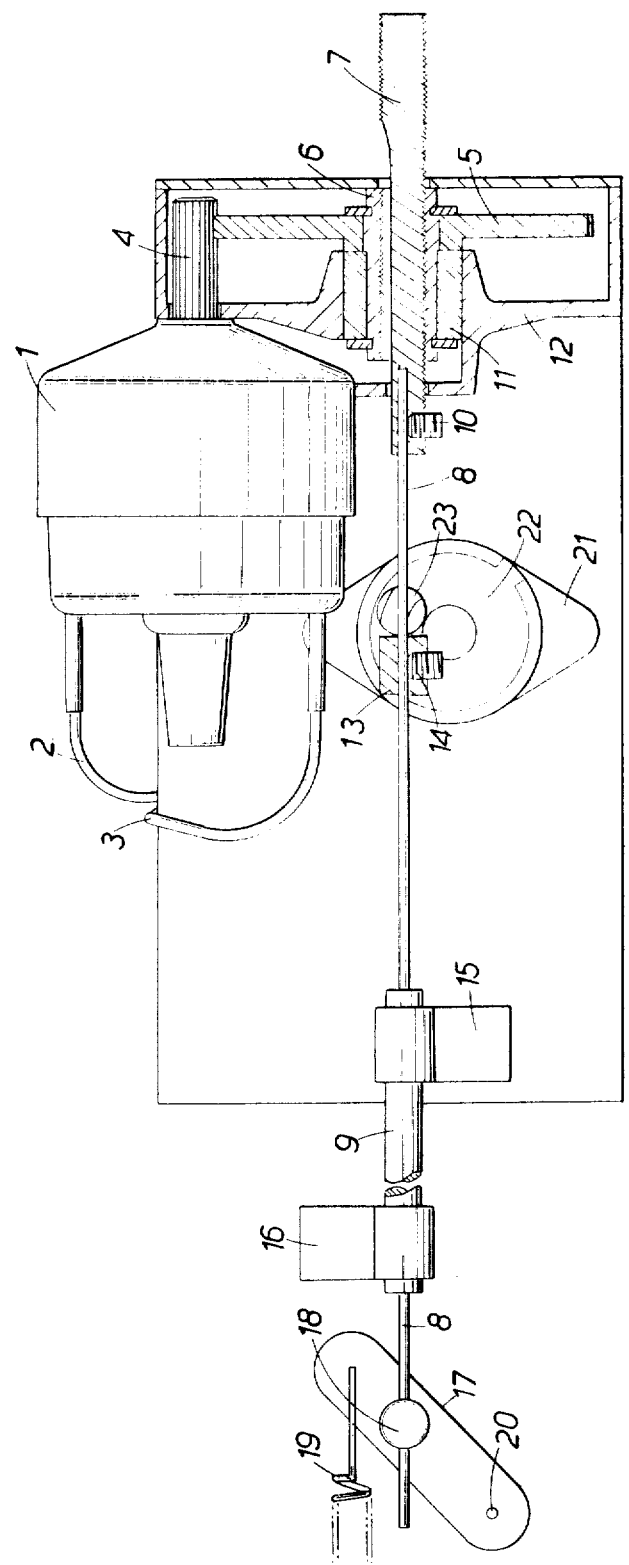
FIG. 1 is a perspective partly sectional view of one embodiment of the invention.
Figure 2:
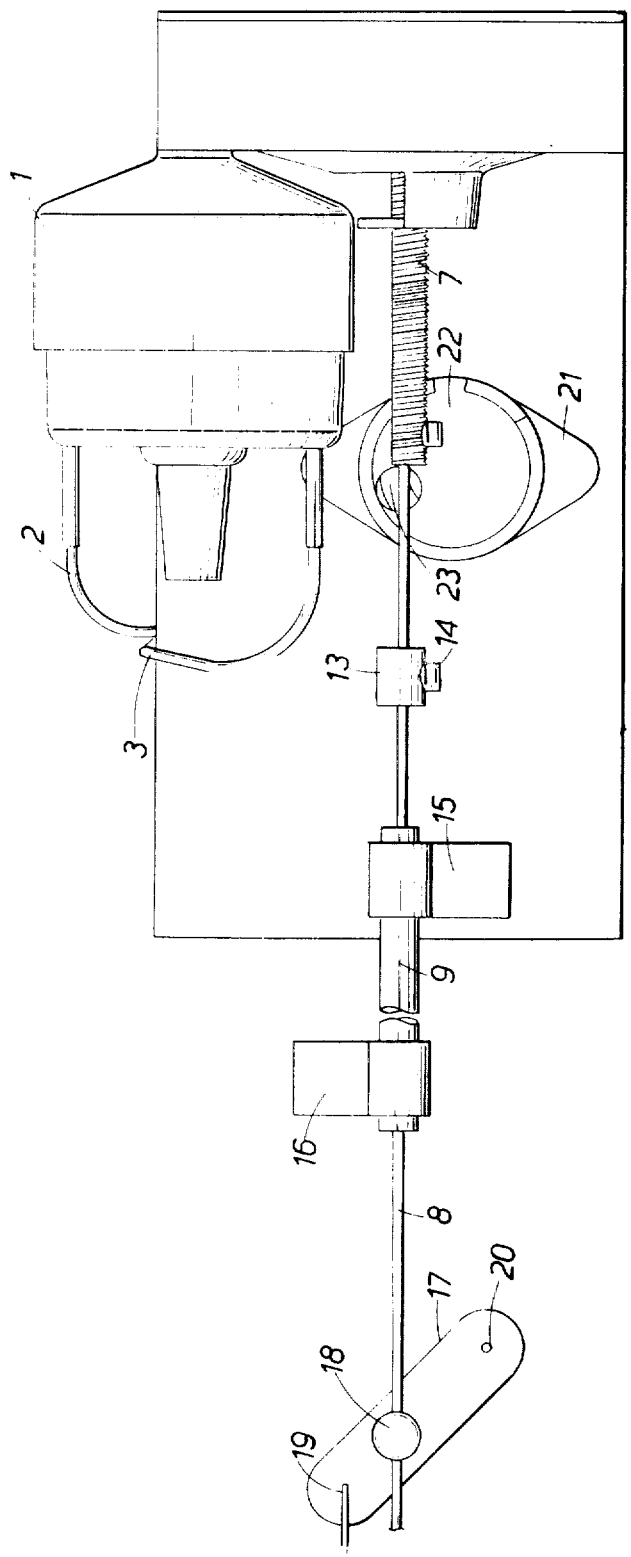
FIG. 2 is a perspective view of the embodiment of FIG. 1 in an alternative position.

Referring to FIGS. 1 and 2 an electric motor 1 having electrical leads 2 and 3 is provided with a pinion 4 which engages with a gear 5 which is provided with an internally threaded boss 6. Provided within the internal threaded boss 6 is a longitudinally movable externally threaded driven member 7 which is secured to the interior core 8 of a Bowden Cable 9 by means of a grub screw 10 passing through a portion of the driven member 7 and engaging with a portion of the core 8. The boss 6 is rotatably mounted on a bearing 11 which is mounted on a housing 12. Provided on a portion of the core of the cable 8 is a nipple 13 which is secured thereto by means of a grub screw 14.

The Bowden cable 9 is secured at each end thereof by means of clamps 15 and 16 respectively and the terminal portion of the core 8 of the Bowden cable is secured to a pivotal lever 17 by means of a stud 18. The lever 17 is biassed by means of a spring 19 and is pivotally mounted about a pivot point 20. The lever 17 is adapted to control a fuel valve of the vehicle.

Mounted adjacent a portion of the core of the Bowden cable 8 between the nipple 13 and the end of the driven member 7 is a rotary switch member 21 provided with a rotary member 22 which has a peg 23 extending therefrom, the peg 23 being adapted to be engaged by the nipple 13 or by the end of the member 7. The function of the rotary member 22 will be described in more detail hereinafter with reference to FIGS. 3 to 5.

Referring now to FIGS. 3 to 5 the motor 1 with the pinion 4 is shown connected by the two electrical leads 2, 3 to terminals 24, 25 respectively which are located adjacent the rotary member 22. A further terminal 26 located adjacent the rotary member 22 is connected directly to a terminal 27 of the battery 28, the other terminal 29 of the battery 28 being connected to a terminal 30 of a switching device 31 associated with the ignition switch of a motor vehicle. The switching device 31 has two further terminals 32, 33 which are connected to terminals 34, 35 located adjacent the rotary member 22. The rotary member is provided with three conductive portions 36, 37, 38. The purpose of these portions will be explained hereinafter.

In operation of the device when the ignition switch of the vehicle is turned on the electric motor 1 is actuated to drive the driven member 7 thus moving the fuel valve control lever 17 to supply fuel to the engine of the vehicle, the arrangement being such that when the ignition is turned off the electric motor 1 is again actuated to drive the driven member 7 to retract the fuel valve control lever 17 to its original position, thereby disconnecting the fuel supply to the vehicle.

FIG. 3 of the drawings shows the circuit arrangement when the ignition has just been turned on, the apparatus then being in the position illustrated in FIG. 2. It can be seen that the switching device 31 associated with the ignition is located to connect the terminals 30 and 33 and thus a series circuit is completed from the terminal 29 of the battery through terminals 30 and 33 of the switching device 31, and through terminals 35 and 24 to the electric motor 1 and through terminals 25 and 26 returning to terminal 27 of the battery 28. Thus it can be seen the electric motor 1 will be driven in a predetermined direction and that direction is such that the core 8 of the Bowden cable will move to the left as shown in FIG. 1. The lever 17 will be pivoted in an anticlockwise direction and such movement of the lever 17 will open the fuel control valve, thus connecting the fuel supply to the vehicle, and the apparatus will then be in the position shown in FIG. 2. When the end of the driven member 7 engages with the pin 23 upstanding from the rotary member 22 the rotary member 22 will be moved in the direction indicated by the arrow 39 as shown in FIG. 3 and thus the circuit illustrated in FIG. 4 is obtained. It can be seen that when the rotary member 22 is moved the conductive portion 38 will connect terminals 26 and 24, the conductive portion 37 will connect terminals 34 and 25 and the conductive portion 36 will not be connecting any of the terminals. Similarly it can be seen that no conductive portion will be contacting the terminal 35 and thus the series circuit between the battery and the motor 1 is broken and the motor 1 will no longer rotate. This is the condition illustrated in FIG. 4.

When the ignition of the vehicle is switched off the terminals 30 and 32 will be connected by the switching device 31 and thus a series circuit between the battery and the electric motor 1 will again be completed, this being the circuit illustrated in FIG. 5. The series circuit will extend from the terminal 29 through terminals 30 and 32 and then through terminals 34 and 25 through lead 3 to the electric motor 1 and then through lead 2 to terminal 24 through terminal 26 to terminal 27 of the battery 28. Thus it can be seen a D.C. Current will flow through the electric motor 1 in the opposite sense to that in which it flowed therethrough when the first series circuit was completed, and thus it can be seen that the electric motor 1 will rotate in the opposite direction. Thus the driven member 7 will be moved so that the core of the Bowden cable moves to the right as shown in FIGS. 1 and 2, thus pivoting the fuel valve control lever in a clockwise direction, thus closing the fuel control valve and disconnecting the fuel supply of the the vehicle, this being the position indicated in FIG. 1 of the drawings. The motor will continue to operate until the nipple 13 engages with the pin 23 and rotates the rotatable member 22 thus returning the rotatable member 22 to the position as shown in FIG. 3. It can be seen that when this occurs the series circuit through the electric motor is broken and the circuit only be recompleted when the switching device is again returned to the on position.

The nipple 13 is secured to the core of the Bowden cable 8 by means of a grub screw, and thus the positioning of the nipple 13 may be adjusted to enable varying stroke lengths of operation to be achieved. The tension spring 19 is provided to ensure smoothness of movement and to ensure that there is a constant tension applied to the Bowden cable 8, 9.

It can be seen that in utilising this embodiment of the invention as soon as the ignition is turned off the electric motor will operate to cut off the fuel supply to the vehicle whereas as soon as the ignition is turned on again the electric motor will again operate to complete the furel supply of the vehicle.

In an alternative embodiment of the invention illustrated in FIGS. 6 to 8 a vehicle control system includes a key operated device including a control switch (not shown) such as a key operated electrical services control switch, or a key operated ignition switch, the switch having two positions which may be termined an "on" position and an off position. The key operated deviced includes a lock having a locking detent adapted to engage with and lock against movement a component of the vehicle such as the steering wheel, the gear lever or a gear selector shaft, when the switch of the key operated device is in the off position.

An auxiliary fuel cut off device is provided which comprises a housing 40 of substantially "U" cross-section having a circular rotary member 41 which extends parallel to the base portion of the U and which is supported on said base by an axle 42 which is mounted on bearings 43 located on said base portion. The periphery 44 of the rotary member 41 is geared and an electric motor 45 is provided which is mounted on one of the arms of the U sectioned housing 40, said motor having a shaft 46 which is driven thereby and which carries a worm gear 47, said worm gear being positioned to intermesh with the gears of the periphery 44 of said circular member 41. Thus upon energisation of the motor 45 the worm gear drives 47 the rotary member 41 with a rotary motion.

Connected to the rotary member at a point remote from the axis of rotation thereof is an elongate member 48 in the form of an operating rod which is connected to a valve (not shown) in the fuel supply system of the vehicle. Such a valve may be incorporated in the fuel pump and thus the operating rod 48 may be connected to a valve operating lever on the fuel pump. The valve is such that when the rotary member 41 is in one predetermined position the operating rod serves to "close" the fuel supply to the engine of the vehicle, whereas when the rotary member is rotated through an angle of 180° from said one predetermined position to a second predetermined position the operating rod serves to "open" the fuel supply system of the vehicle. Thus by adjusting the position of the rotary member 41 the fuel supply can be opened and closed.

The rotary member 41 is provided with a cam member 49 which has the same axis of rotation as the rotary member and which is formed about the axle 42 on which the rotary member 41 is supported. The cam member 49 has two portions 50, 51 each extending over an angle of arc of substantially 180°, one portion 51 being of lesser radial extent than the other portion 50.

Two paris of contacts 52, 53 are provided which are mounted on the arm of the U shaped housing 40 which is not supporting the electric motor 45. One contact of each pair of contacts is a spring contact which is adapted to engage with said cam member 49 and be moved thereby. Each of these spring contacts is positioned and located such that when it is touching the portion 50 of the cam surface of greater radial extent the pair of contacts is closed whereas when it is touching the portion 51 of the cam member of lesser radial extent the pair of contacts are opened. The pairs of contacts 52, 53 are located in diametrically opposed positions with respect to the cam member so that one or other of the pairs of contacts will always be closed, and the remaining pair of contacts will always be opened, the particular pair of contacts which is closed being determined by the angular position of the cam member 49.

The pairs of contacts 52, 53 are included in the electrical control circuit of the electric motor 45, and one contact of each of the pairs of contacts is fed to the supply circuit of the motor. The other contact one of each of the pairs of contacts is connected to the control switch and the arrangement is such that the contact of one of the pairs of contacts is energised when the control switch is in the on position, whereas the contact of the other pair of contacts is energised when the control switch is in the off position. Thus should the pair of contacts which are energised when the control switch is turned on be closed the motor 45 will be energised and the rotary member 41 will be rotated until the cam member 49 has rotated through such an angular extent that the portion of the cam member of lesser radial extent 51 is engaged by the movable contact of the pair of contracts under consideration, thus opening the contacts and breaking the supply circuit of the electric motor 45, thus stopping the electric motor.

The second pair of contacts includes one contact which is connected to the electric supply circuit for the electric motor, the other of said contacts being connected to the control switch, the arrangement being such that said other contact is energised when the control switch is in the off position. Thus should these contacts be closed when the control switch is turned off the electric motor will be energised and the rotary member 41 will be rotated until the portion of the cam member 49 of lesser radial extent 51 is engaged by the movable contact of the pair of contacts under consideration, thus breaking the circuit supplying electric power to the electric motor, thereby causing the electric motor to stop.

In operation of the device a vehicle driver will insert a key into the electrical services control switch and turn the key to the on position, thus completing electrical circuits in the vehicle, and removing the locking detent from the steering shaft, gear selector shaft or other component of the vehicle. Simultaneously the first pair of contacts 52 will be energised. As will be explained hereinafter the auxiliary control device will initially be in such position that the operating rod will be positioned to close the fuel supply to the engine while the first pair of contacts 52 will be closed.

Upon the energisation of the first pair of contacts 52 the electric motor 45 will be energised and the rotary member 41 will be rotated thereby. The movable contact of the first pair of contacts 52 will be engaged by the portion 50 of the cam member 49 of greater radial extent, said portion 50 of the cam member extending over an angle of arc of substantially 180°. Thus the rotary member 41 rotates through an angle of substantially 180°, thereby moving the point of connection of the operating rod 48 to the rotary member 41 to a position which is diametrically opposed to the original position thereof. Such a movement results in a movement of the operating rod 48 which serves to open the fuel supply of the vehicle to the engine. At this point the movable contact of the first pair of contacts 52 engages with the portion 51 of the cam member 49 of lesser radial extent thereby opening the first pair of contacts 52 and stopping the electric motor 45. Simultaneously the movable contact of the second pair of contacts 53 engages with the portion 50 of the cam member 49 of greater radial extent thereby closing the second pair of contacts 53. Thus, by turning the key to the on position the driver of the vehicle has completed electrical circuits in the vehicle, has unlocked and freed a component of the vehicle which was previously locked against movement and also opened the fuel supply to the engine of the vehicle.

On stopping the vehicle the driver may turn the key to the off position and one contact of the second pair of contacts 53 will be energised. The second pair of contacts are in the closed position, as hereinbefore described, and thus the electric motor 45 will be energised and the rotary member 41 will be rotated thereby. Again the motor will rotate the rotary member through an angle of 180° until the movable contact of the second pair of contacts 53 thus engages with the portion 51 of the cam member 49 of lesser radial extent, thereby opening said second pair of contacts 53 and breaking the supply circuit to the electric motor 45. At this time the operating rod 48 is returned to its original starting position thus closing the fuel supply, and also a contact of the first pair of contacts 52 engages with the portion 50 of the cam member 49 of greater radial extent thereby closing said first pair of contacts. Thus, on turning the key to the off position the driver of the vehicle has broken electrical circuits in the vehicle has locked against movement a component of the vehicle such as the steering shaft and has also closed the fuel supply thereof, while returning the auxiliary device to its original starting position.

Figure 9:
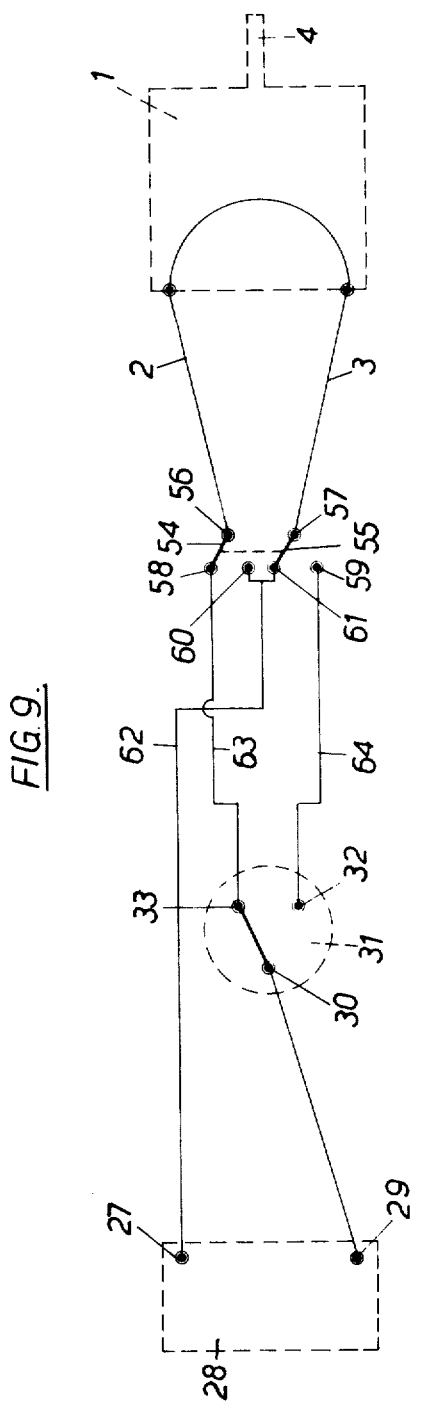
FIG. 9 is a schematic circuit diagram forming part of a further embodiment of the invention which is generally similar to the embodiment illustrated in FIGS. 1 and 2.

FIG. 9 shows a circuit diagram which corresponds partially with the circuit diagrams of FIGS. 3 to 5. Like reference numerals are used for like parts in the circuit diagrams of FIGS. 3 to 5 and FIG. 9.

The circuit diagram of FIG. 9 shows the battery 28, the switching device 31 associated with the ignition switch of a motor vehicle, and an electric motor 1 having a pinion 4 adapted to drive a member to control the fuel supply of a motor vehicle. All these components are the same as the corresponding components of the embodiment of the invention described with reference to FIGS. 1 to 5.

Connected in the circuit of FIG. 9 between the switching device 31 and the electric motor 1 is a two pole two way ganged toggle switch. The switch has two poles or switching elements 54, 55 which are mechanically coupled so that they move simultaneously. The switch assembly has two terminals 56, 57 which are connected to the respective switching elements 54, 55. Terminal 56 is secured to lead 2 of the motor, and lead three of the motor is secured to terminal 57. Switching element 54 may contact terminal 58 or terminal 60, whilst switching element 55 may contact terminal 59 or terminal 61. Terminal 58 is connected to terminal 33 of the switching device 31, and terminal 61 is connected to terminal 32 of the switching device 31. Terminals 59 and 60 are interconnected and are also connected to terminal 27 of the battery.

The toggle switch is located so that the switch will be operated by the nipple 13 and the driven member 7.

In operation of the device when the ignition switch of a motor vehicle is turned on the switching device 31 will be turned to the position illustrated in FIG. 9 and if the switching elements 54 and 55 are contacting the terminals 54, 55 respectively a series circuit will be completed through the electric motor 1, starting from terminal 29, extending through the switching device 31 to terminal 58, then via the toggle switch to lead 2 and the motor, and returning through lead 3 and the toggle switch to terminal 59 and terminal 27 of the battery. The electric motor will then be driven in a predetermined direction so that the driven member 7 moves to the left, the end of the driven member 7 engaging with and subsequently operation the toggle switch.

On operation of the toggle switch the switching elements 54, 55 move to contact the terminals 60, 61 respectively, and thus the circuit is broken and the motor 1 no longer operates. When the ignition of the vehicle is turned off the switching device 31 is operated to connect terminal 32 to terminal 29, thus completing a further series circuit through the electric motor 1, shorting from terminal 29, passing through the switching device 31 to terminal 61, through the toggle switch and lead 3 to the motor and returning via lead 2, the toggle switch and terminal 60 to terminal 27 of the battery. The motor will then operate in the opposite sense until the nipple engages with and operates the toggle switch, thus returning the toggle switch to its original position, thereby breaking the circuit and causing the motor 1 to stop.

It is to be understood that while the present invention has been described with reference to preferred embodiments in which a component of the vehicle such as the steering shaft or a gear selector shaft is locked against movement by a key operated lock the present invention may equally well be utilised in vehicles having a control switch which solely functions to complete electrical circuits in a vehicle.

It is also understood that a manual over-ride arrangement may be provided in case the electric motor of either described embodiments of the invention fails. Such a manual over-ride would enable the fuel supply of the vehicle to be connected manually only after the key operated device has been operated to remove the locking detent from the steering shaft gear selector shaft or other component of the vehicle. Such a manual over-ride should be such that the fuel supply system of the vehicle should be disconnected prior to the key operated device being operated to lock the steering shaft gear selector shaft or other component of the vehicle.

Furthermore, it is also to be understood that whilst the invention has been described with reference to an embodiment in which a valve controls the fuel supply of a vehicle the fuel supply may be controlled by means adapted to prevent fuel from being compressed in a cylinder of an engine, for example by means adapted to open the exhaust valves of the cylinders of the engine.

In the embodiment of the invention illustrated in FIG. 1 a surface of the driven member 7 is flat and thus a portion of the driven member has a non-circular cross section. This portion passes through a correspondingly shaped aperture in the housing 12 to prevent the member 7 from rotating when boss 6 is rotated. It is to be understood that alternative methods of preventing the rotation of member 7 may be adapted. In particular a portion of the housing may be adapted to be adjacent the member 7, this housing portion having an elongate recess or channel therein extending parallel to the axis of the driven member. A pin or stud extending perpendicularly from the driven member may be accommodated in the recess or channel, thus preventing the rotation of the driven member.

I claim:
1. A vehicle control system comprising:
   a manually operated control switch;
   an auxiliary device adapted to operate in response to actuation of the control switch, said auxiliary device being adapted to control a fuel supply system of the said vehicle said device comprising
   an electric motor,
   a member in mechanical engagement with and driven by said electric motor, the arrangement being such that the member is driven to one position when said control switch is in one condition, and is driven to another position when said control switch is in another condition, and
   a control valve incorporated in the fuel supply system of the vehicle, the driven member being connected to said control valve so that the control valve is closed when said driven member is in said one position, and is opened when said driven member is in said other position.

2. A vehicle control system as claimed in claim 1 wherein said control switch is incorporated in a key operated device.

3. A vehicle control system as claimed in claim 1 wherein said control switch is adapted to be operated simultaneously with a manually operable lock for locking against movement a component of the vehicle.

4. A vehicle control system as claimed in claim 1, wherein the driven member is an externally threaded member adapted to be driven by engagement with an internally threaded axial bore in a gear wheel driven by said motor.

5. A vehicle control system as claimed in claim 1, wherein means are provided for controlling said motor, said means comprising a rotary member adapted to be driven between two positions in response to movement of said driven member, electric switching means being provided on the rotary member adapted to control the electric motor.

6. A vehicle control system as claimed in claim 1 wherein means are provided for controlling said motor, said means comprising a two way two pole ganged switch adapted to be driven between two positions in response to movement of said driven member.

7. A vehicle control system as claimed in claim 1, wherein said driven member may be moved in response to movement of a rotary member which is rotated by said motor, and said driven member is constituted by an elongate member which is connected to said rotary member at a point spaced from the axis of rotation of said rotary member.

8. A vehicle control system as claimed in claim 7, wherein said rotary member is rotated by said motor by means of a worm gear arrangement.

9. A vehicle control system as claimed in claim 7, wherein a cam is provided on said rotary member, said cam being adapted to be rotated simultaneously with said rotary member, said cam having two portions of equal angular extent, each said portion of said cam surface extending over an angular arc of approximately 180°, one portion extending further from the axis of rotation of said cam than the other portion, two sets of contacts being provided, one of each set bearing upon a cam surface of said cam member, the contacts being positioned so that one set of contacts will be closed whenever the other set of contacts is opened and vice versa, the contacts being included in an electrical circuit controlling the said motor.

10. A vehicle control system as claimed in claim 7, wherein a contact of one of said sets of contacts may be energised when said control switch is in one position, and a contact of the other of said sets of contacts may be energised when said control switch is in the other position.

* * * * *